US006804769B1

(12) United States Patent
Carlson

(10) Patent No.: US 6,804,769 B1
(45) Date of Patent: Oct. 12, 2004

(54) UNIFIED BUFFER FOR TRACKING DISPARATE LONG-LATENCY OPERATIONS IN A MICROPROCESSOR

(75) Inventor: Richard Carlson, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,036

(22) Filed: Feb. 18, 2000

(51) Int. Cl.[7] .................................................. G06F 9/30
(52) U.S. Cl. ...................................... 712/214; 712/217
(58) Field of Search ............................ 710/56; 712/216, 712/217, 214, 215

(56) References Cited

U.S. PATENT DOCUMENTS

| | | | |
|---|---|---|---|
| 4,158,235 A | | 6/1979 | Call et al. |
| 5,050,070 A | * | 9/1991 | Chastain et al. ............. 712/203 |
| 5,168,560 A | * | 12/1992 | Robinson et al. ........... 711/123 |
| 5,459,839 A | | 10/1995 | Swarts et al. |
| 5,627,983 A | * | 5/1997 | Popescu et al. ............. 712/217 |
| 5,781,802 A | | 7/1998 | Cassetti |
| 5,859,999 A | | 1/1999 | Morris et al. |
| 5,860,017 A | | 1/1999 | Sharangpani et al. |
| 5,884,099 A | | 3/1999 | Klingelhofer |
| 6,105,128 A | * | 8/2000 | Hathaway et al. .......... 712/215 |
| 6,161,153 A | * | 12/2000 | Porterfield et al. ......... 712/217 |
| 6,370,639 B1 | * | 4/2002 | Huck et al. .................. 710/52 |

FOREIGN PATENT DOCUMENTS

| | | | |
|---|---|---|---|
| EP | 0419066 A2 | 8/1990 | ........... G06F/13/42 |
| GB | 2335762 A | 9/1999 | ............. G06F/5/06 |

OTHER PUBLICATIONS

Popescu, V et. al., "The Metaflow Architecture", Jun. 1991, IEEE Micro, vol. 3 Issue:3, pp. 10–13, 63–73.*
Wolfe, A., "Patents shed light on Merced's Innards", Electronic Engineering Times, Feb. 15, 1999.
European Search Report dated Nov. 29, 2001, for corresponding application No. GB0102456.1.
Wolfe, A., "Patents shed light on Merced's Innards", Electronic Engineering Times, Feb. 15, 1999.
European Search Report dated Nov. 29, 2001, for corresponding application No. GB102456.1.

* cited by examiner

*Primary Examiner*—Richard L. Ellis
*Assistant Examiner*—Charles Harkness

(57) ABSTRACT

A unified buffer, comprising a shifting queue, receives instructions to be tracked by receiving units in a computer architecture. The receiving units search the unified buffer from the oldest entry to the most recent entry. Status bits in each entry indicate which of the receiving unit(s) the entry is destined for. Existing entries in the unified buffer shift down when a new entry is inserted at the top. Entries may be passed to different receiving units by updating the status bits; and an entry expires after it has been accepted by its final receiving unit.

34 Claims, 3 Drawing Sheets

UNIFIED BUFFER FOR TRACKING DISPARATE LONG-LATENCY OPERATIONS IN A MICROPROCESSOR

TECHNICAL FIELD

The technical field is storage systems used within microprocessors.

BACKGROUND

Buffers are commonly used in modern computer systems for temporary storage of information passing from a sending functional unit to a receiving functional unit, until the information can be accepted and used by the receiving functional unit. This structure allows the sending functional unit to continue to process new requests, and possibly send additional information to the receiving functional unit, even though the receiving functional unit is not ready to accept the additional information. If the buffer has sufficient capacity (has enough entries), the buffer will absorb typical bursts of information transfers, avoiding the need to stall the sending functional unit, and improving the overall performance of the computer system.

In a microprocessor, an instruction dispersal unit (the sending functional unit) may issue several types of instructions to various execution units (the receiving units) that have long or indeterminate latencies to accept those instructions. Furthermore, after processing the instructions, those receiving functional units may in turn become sending functional units as they pass information on to other execution units. A typical architecture would implement several distinct buffers: one between each pair of sending and receiving functional units. The disadvantage of this approach is that each buffer may require a lot of area and circuitry, since one data storage element (flip-flop) is needed for each bit of information in every buffer entry, and each buffer should have enough entries to accommodate typical data bursts. Alternatively, to save area and circuitry, the depth of each buffer may need to be reduced below its optimum size. Then, since each buffer is independent, one buffer may fill even though other buffers are idle, causing extra stalls and reducing system performance.

SUMMARY

To overcome the above-mentioned problems associated with multiple independent buffers, a master tracking buffer is created that uses this same buffer structure for several types of long- or intermediate-latency instructions, and for tracking instructions as the instructions progress through all of the necessary functional units until the instructions are retired. The master tracking buffer uses additional control bits to perform the tracking function. However, the master tracking buffer requires only a few additional flip-flops over the number of flip-flops found in a single traditional buffer of equivalent depth. Furthermore, the benefits of the master tracking buffer can be shared among all data transfer paths it buffers. This is in contrast to multiple independent buffers where some buffers may sit idle even when additional buffering is required somewhere else in the system.

The basic structure of the tracking buffer is a shifting queue. When a new instruction to be tracked is issued by the instruction dispersal unit, information for that instruction is stored as the top entry in the tracking buffer, and all existing buffer entries shift down. In an embodiment, at most one tracked instruction is issued per clock cycle. In another embodiment, more than one tracked instruction may be issued and stored in the tracking buffer per clock cycle. In this alternative embodiment, the tracking buffer must be able to shift existing buffer entries down by a multiple number of entries.

DESCRIPTION OF THE DRAWINGS

The detailed description will refer to the following drawings in which like numerals refer to like objects, and in which.

DETAILED DESCRIPTION

To reduce the need for multiple independent buffers in a computer system, a unified buffer is provided that stores certain types of long-latency or indeterminate latency instructions. The unified buffer tracks these instructions as the instructions progress through various functional units in the computer system. The unified buffer allows one or more instructions to be issued in a given clock cycle.

Figure 1:
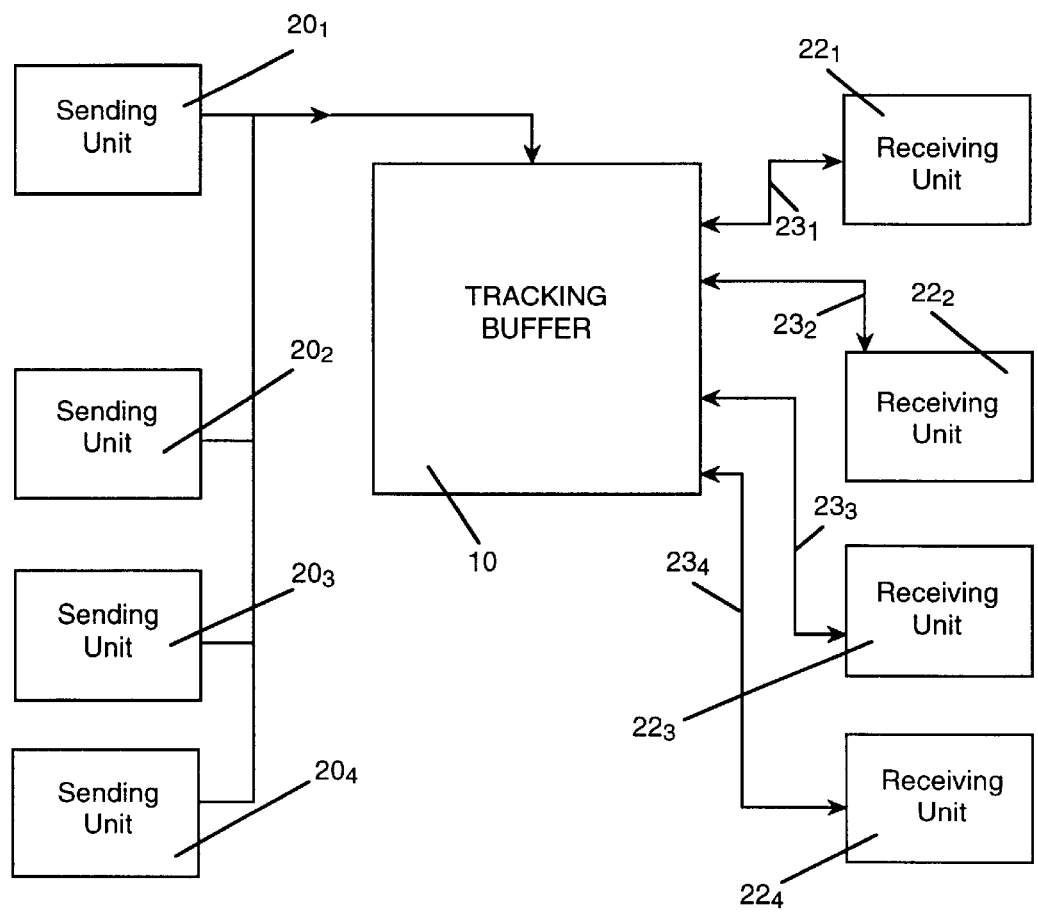
FIG. 1 shows an overall architecture incorporating a tracking buffer.

FIG. 1 is a block diagram of a computer system having a unified tracking buffer 10 that stores long-latency and indeterminate-latency instructions. The tracking buffer 10 is coupled to sending functional units $20_i$ that may send instructions for execution. The tracking buffer 10 is also coupled to receiving functional units $22_i$ that receive the instructions from the tracking buffer 10, and that may in turn modify and send those instructions back to the tracking buffer 10 to be handled by other receiving units. Each receiving functional unit $22_i$ is coupled to the tracking buffer 10 by its own control line or information bus $23_i$.

Figure 2:
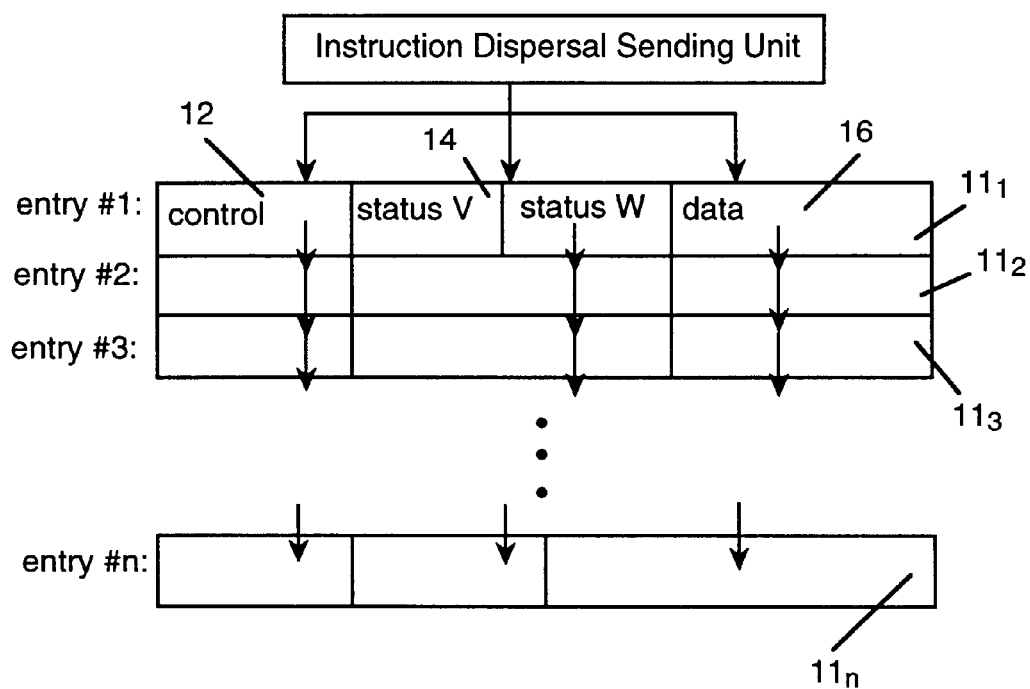
FIG. 2 shows a shifting queue as seen and used by an instruction dispersal unit.

FIG. 2 is shows how a sending functional unit provides instructions for loading into the tracking buffer 10. The sending unit always installs new entries into the first slot $11_i$, and all other entries simultaneously shift down to make room for that new entry. Each buffer entry in the tracking buffer 10 includes three types of information. A static control and identification (ID) field 12 includes information that identifies a specific instruction. A status field 14 includes dynamic status information. A data Field 16 includes operating data. The static control information is set only once when a new entry is created, for example when an instruction has been issued by the dispersal unit. The static control information remains unchanged with the entry as long as the entry remains in the tracking buffer. The static control information may include register ID values that identify which particular register to read data from or to write data to. The static control information may also include type bits indicating what operations the instruction must perform. Finally, the static control information may include other basic information the receiving functional units can use to decide how to operate on the instruction.

The dynamic status information includes the routing information for the entry. In other words, the information indicates which receiving unit(s) should accept the data in the entry either immediately, or only after another receiving functional unit has accepted and updated the entry. The dynamic status information may includes bits to distinguish committed from speculative instructions, and other status related to the instruction's progress down the pipeline. The dynamic status information can also include pending status bits, which indicate when any operation of a certain type is in progress, and therefore can be used to stall subsequent instructions that rely on the results of that operation. These fields are initialized when a new entry is created in the tracking buffer. The fields may be updated when a receiving function unit accepts, and possibly processes, information in an entry. The fields may also be updated at any time the current status of the system or executing instructions causes the status of the instructions in an entry to change.

The operating data may be initialized when an entry is created. The operating data may also be updated by a later execution unit. Typically, at least the final receiving functional unit for the instruction will read and operate on the data.

When a receiving functional unit is ready to accept information, the receiving functional unit searches the tracking buffer to identify an entry that is destined for the receiving functional unit, as indicated by the appropriate status bits. The receiving functional unit performs the search from the bottom up, or from the first oldest entry to the most recent entry, and accepts the first such entry. Thus each receiving unit can independently accept information from the tracking buffer, and multiple entries may be accepted by different receiving units during each clock cycle. Thus, the information delivered to each particular receiving functional unit remains in a first-in-first-out order, even though a particular receiving functional unit is not constrained by having to wait for older information to be delivered to other receiving functional units.

To ensure that a receiving unit accepts its requests in a FIFO order, if there are multiple entries in the tracking buffer 10 destined for the same receiving unit 22, then that receiving unit must always accept the highest-numbered (farthest down the tracking buffer) entry, since the highest-numbered entry will be the oldest entry 11 waiting in the tracking buffer 10. This can be accomplished with the following combinational logic. If a status bit "v" in each entry 11 that indicates that the entry 11 is valid for a particular receiving unit 22, then:

```
select entry #n if entry #n,v == 1;
select entry #n−1 if (entry #n−1,v == 1) and (entry #n,v == 0);
select entry #n−2 if (entry #n−2,v == 1) and (entry #n−1,v == 0) and (entry #n,v == 0);
  .
  .
  .
select entry #1 if (entry #1,v == 1) and all other entries "v" bits are 0.
```

If the receiving unit 22 is not ready to accept new information, no entries 11 are selected. This can be implemented by adding an extra "and (receiver_ready==1)" term to all of the above equations.

In no entry 11 is valid for the receiving unit 22, then the receiving unit 22 must wait even if the receiving unit 22 is ready to accept new information. This condition can be detected by taking the logical NOR of the "v" bits in all of the entries 11.

If there are many receiving units 22, it may be more efficient to have a set of encoded valid bits, rather than a separate bit for each receiving unit 22. In this case, the above equations would check to see if the encoded valid bits match a particular encoding, rather than checking if the single valid bit is set.

Once an entry 11 has been selected by this method, its information (i.e., control and/or data fields as needed by the receiving unit 22) is driven out to the receiving unit 22. In an embodiment, a single information bus spans all of the tracking buffer entries, and arrives at the receiving unit 22. All of the entries 11 have the ability to drive information onto that bus, but only the one currently selected entry 11 is enabled to drive the bus. If the tracking buffer 10 has relatively few entries 11, an ordinary multiplexer could also be used to select the data going to the receiving unit 22.

In this embodiment, each receiving unit 22 requires its own unique information bus from the tracking buffer so that multiple receiving units 22 may each receive data from the receiving unit's own oldest entries 11 in the tracking buffer 10 simultaneously.

Figure 3:
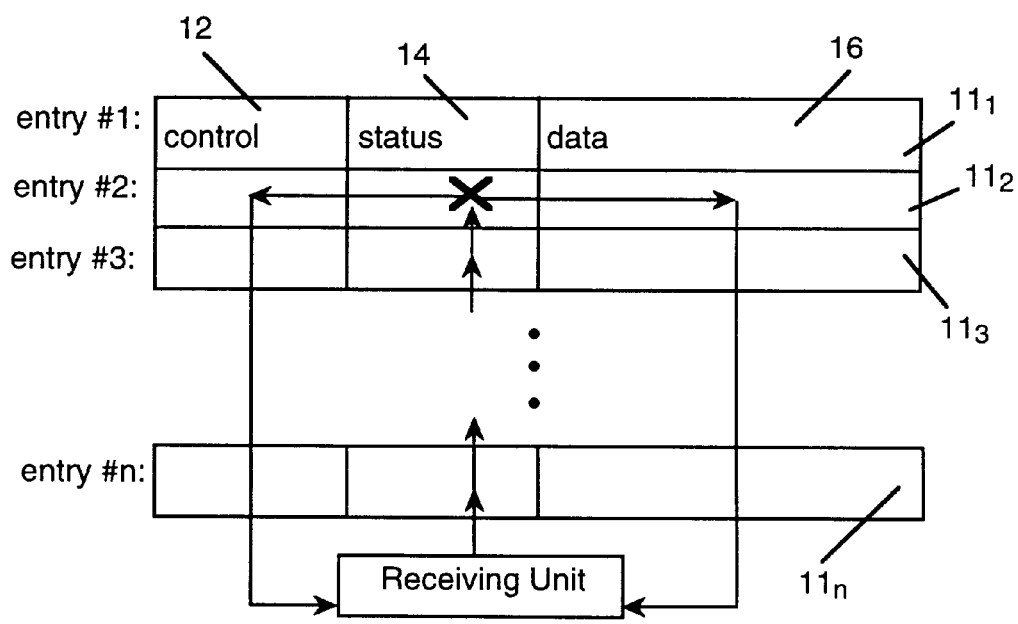
FIG. 3 shows a shifting queue as seen and used by a receiving functional unit.

FIG. 3 illustrates how receiving functional units read data from the tracking buffer 10. In FIG. 3, a receiving unit, such as the receiving unit 22 shown in FIG. 1, receives data from the tracking buffer 10 by searching for the entries $11_i$ that are addressed to the receiving unit 22. The receiving unit 22 starts by reading the oldest possible entry (i.e., entry $11_n$) and progressing to more recent entries. The receiving unit 22 determines which of the entries $11_i$ pertain to the receiving unit by reference to the status bits 14 included in the entries $11_i$.

For a receiving unit 22 to also become a sending unit 20, and pass the tracking buffer's entry information to another receiving unit 22, the original receiving unit simply updates the status bits 14 (and possibly the data 16) for the desired entry 11, such that the next receiving unit 22 will recognize and accept the entry. Depending on the complexity of the desired changes, this update to the entry 11 can be completed at the same time as, or after the receiving unit 22 accepts and processes the entry 11.

Although the receiving units 22 control when the status bits 14 in the tracking buffer 10 are updated, the tracking buffer 10 will typically contain the actual logic to update the status bits 14, and the updating can happen automatically when an entry 11 is selected by a receiving unit 22. For example, if a status bit called "v" is used to indicate operations that are being sent to receiving unit $22_3$, then entry $11_3$ may be selected to be received by the receiving unit $22_3$ because the entry's "v" bit, and none that is older, is set. Then, the selected signal, in addition to driving information from the entry $11_3$ to the receiving unit $22_3$, will clear the "v" bit in the entry $11_3$ as well. Thus, this entry will not be selected the next time that the receiving unit $22_3$ requests new information. If the entry $11_3$ must then pass to a different receiving unit $22_4$, the select signal can additionally set another status bit, such as the status bit "w", in the entry $11_3$, where status bit "w" is used to indicate operations that are being sent to receiving unit $22_4$. Then, the receiving unit $22_4$ will know that an entry has been processed by the receiving unit $22_3$. The entry $11_3$ can then be accepted by the receiving unit $22_4$ by checking that the "w" bit is set in the entry $11_3$. Once an entry has been accepted by the last receiving unit that needs to handle the entry, the entry simply expires. The entry's data and control information may remain in the tracking buffer 10, and shift down when new entries are inserted, but the entry's status information will indicate that no receiving units need to handle and the entry, the entry will be ignored.

General system status (for example the instruction pipeline control signals) can also search for particular entries (that contain a specific status) and update their status bits appropriately. As an example of general system status updating of the status bits in the tracking buffer 10, a processor may have a pipeline with three final pipeline stages of Execute, Detect and Writeback where an instruction architecturally commits its state only after the instruction advances past the Writeback stage. Instructions are written into the tracking buffer 10 during the Execute stage, so that some receiving units 22 can speculatively accept and begin processing information from entries in the Detect and Writeback stages. However, Detect stage operations in the processor can be stalled, and both detect and Writeback stage operations can be flushed. Even though instructions in the tracking buffer 10 may not be completed until well after their Writeback stages, these instructions must still obey the processor's standard pipeline rules while the instructions are in the Detect and Writeback stages. Thus, the tracking buffer 10 includes status bits 14 indicating whether an entry $11_i$ is in the Detect or the Writeback stage. The tracking buffer 10 reads the processor's standard pipeline control signals to determine whether Detect stage entries should be advanced into the Writeback stage. The tracking buffer 10 also determines whether the Detect or Writeback stage entries must be flushed (invalidated), in which case these entries have their status bits cleared causing them to expire. The receiving unit 22 can also check the status bits 14 if the receiving unit 22 needs to know whether an instruction corresponding to the entry is speculative or is known to have architecturally retired (i.e., advanced past the Writeback stage).

To check whether any instruction of a particular type is pending, circuitry in the tracking buffer 10 can simply check if there are any entries in the tracking buffer 10 with the corresponding status bit set. To ensure that the tracking buffer 10 does not overflow, the last entry (or entries, if multiple shifts are allowed) should be checked. If the last entry has not expired (that is, if it has any pending receiving unit), the system will be stalled until the last has expired.

For an operation with a long but fixed latency, a status field may simply be implemented as a counter that automatically decrements each cycle. The counter is initialized to the latency of the operation when the receiving unit accepts the associated entry. When the counter reaches zero, the operation is known to have been completed.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An apparatus for tracking disparate long-latency operations in a microprocessor, comprising:

a unified buffer coupled to the microprocessor;

two or more receiving functional units in the microprocessor coupled to the unified buffer, wherein each receiving functional unit is configured to search the unified buffer independently of a scheduler to identify an entry destined for that receiving functional unit and wherein each receiving functional unit searches the unified buffer from a longest-latency entry to a most recent entry in order to identify the entry destined for that receiving functional unit, each receiving functional unit accepting a first such entry in the unified buffer; and one or more sending functional units in the microprocessor coupled to the unified buffer.

2. The apparatus of claim 1, wherein the two or more receiving functional units access the unified buffer simultaneously, each of the two or more receiving functional units capable of independently accepting information from entries in the unified buffer.

3. The apparatus of claim 1, wherein the unified buffer includes at least one of a control field, a status field, and a data field.

4. The apparatus of claim 3, wherein the control field comprises static control information, and wherein the static control information is set for an entry when the entry is created in the unified buffer.

5. The apparatus of claim 4, wherein the static control information further includes:

register identification values, the register identification values identifying a register to read data from and to write data into; and type bits, the type bits indicating what operations an instruction should perform.

6. The apparatus of claim 3, wherein the status field comprises dynamic status information including routing information for the entry, the routing information indicating if the receiving functional unit should accept data in the entry.

7. The apparatus of claim 6, wherein the dynamic status information further includes:

bits that distinguish committed from speculative instructions; and pending status bits that indicate progress of an instruction.

8. The apparatus of claim 6, wherein the dynamic status information is initialized when a new entry is created, and wherein the dynamic status information may be updated.

9. The apparatus of claim 3, wherein each of the two or more receiving functional units is configured to execute an instruction in the respectively identified entry and update the status field and, if the instruction prompted modifying data in the data field, updating the data field in the respectively identified entry in the unified buffer, the updated entry then being available to another receiving functional unit.

10. The apparatus of claim 1, wherein the one or more sending functional units coupled to the unified buffer comprise a plurality of sending functional units coupled to the unified buffer by at least one path.

11. The apparatus of claim 10, wherein only one instruction from the plurality of sending functional units is issued to the unified buffer per clock cycle.

12. The apparatus of claim 10, wherein a plurality of instructions from the plurality of sending functional units are issued to the unified buffer per clock cycle.

13. The apparatus of claim 12, wherein the unified buffer is operable to shift existing buffer entries down by a number of instructions received from the plurality of sending functional units.

14. The apparatus of claim 1, wherein the two or more receiving functional units are in the microprocessor.

15. The apparatus of claim 14, wherein the one or more sending functional units are in the microprocessor.

16. The apparatus of claim 1, wherein the one or more sending functional units are operable to store instructions in the unified buffer to be executed by at least one of the receiving functional units.

17. The apparatus of claim 16, wherein the one or more sending functional units are operable to store control bits with the instructions for tracking the instructions as the instructions progress through all of the necessary receiving functional units until the instructions are retired.

18. A method for treating disparate long-latency operations in a microprocessor, comprising:

providing a unified buffer coupled to the microprocessor;

coupling two or more receiving units in the microprocessor to the unified buffer such that each receiving functional unit is configured to search the unified buffer independently of a scheduler to identify an entry destined for that receiving functional unit;

coupling one or more sending functional units in the microprocessor to the unified buffer; and creating an entry in the unified buffer from one of the sending functional units, the entry including an instruction to be executed by one of the receiving functional units.

19. The method of claim 18, further comprising:

searching the unified buffer to identify an entry destined for a particular receiving functional unit; and accepting a first such entry by the particular receiving functional unit.

20. The method of claim 18, wherein the unified buffer includes at least one of a control field, a status field, and a data field.

21. The method of claim 20, further comprising setting static control information in the control field when the entry is created.

22. The method of claim 20, further comprising:

recording register identification data in the control field when the entry is created; and recording type bits in the control field, the type bits indicating an operation to perform.

23. The method of claim 20, further comprising recording dynamic status information in the status field, the dynamic status information including routing information.

24. The method of claim 20, further comprising:

executing an instruction in the identified entry;

updating data in the data field of the identified entry if the instruction prompted modifying the data; and updating the status field in the entry in the unified buffer, the updated entry thereby being available for another receiving functional unit.

25. The method of claim 18, wherein coupling one or more sending functional units to the unified buffer comprises coupling a plurality of sending functional units to the unified buffer.

26. The method of claim 25, further comprising sending only one instruction from the plurality of sending functional units to the unified buffer per clock cycle.

27. The method of claim 25, further comprising sending a plurality of instructions from the plurality of sending functional units to the unified buffer per clock cycle.

28. The method of claim 27, further comprising shifting existing buffer entries down by a number of instructions received from the plurality of sending functional units.

29. An apparatus for treating disparate long-latency operations in a microprocessor, comprising:

unified buffer means for creating and storing entries;

sending unit means in the microprocessor and coupled to the unified buffer means for sending at least one instruction to the unified buffer means; wherein the unified buffer means creates at least one of the entries from the at least one instruction; and two or more receiving unit means in the microprocessor and coupled to the unified buffer means, each of the receiving unit means for independently searching the unified buffer means to identify an entry destined for the receiving unit means.

30. The apparatus of claim 29, wherein the entries comprise at least one of a control field, a status field, and a data field.

31. The apparatus of claim 30, wherein the status field comprises dynamic status information including routing information for a respective entry, the routing information indicating if the receiving unit means should accept data in the respective entry.

32. The apparatus of claim 29, wherein the sending unit means is configured to send a plurality of instructions to the unified buffer means per clock cycle.

33. The apparatus of claim 32, wherein the unified buffer means comprises means for shifting existing buffer entries down by a number of instructions received from sending unit means.

34. An apparatus comprising:

at least one sending functional unit in a microcompressor operable to disperse instructions to a plurality of receiving functional units in the microprocessor;

a master tracking buffer coupled to the at least one sending functional unit and the plurality of receiving functional units, the master tracking buffer storing instructions and control bits for each instruction received from the at least one sending functional unit, the control bits being used to track the instructions as the instructions are executed by at least one of the receiving functional units until the instructions are retired;

wherein each of the receiving functional units are operable to independently search the master tracking buffer to identify an instruction to be executed by the respective receiving functional unit.

* * * * *